United States Patent [19]
Krejci et al.

[11] Patent Number: 5,607,777
[45] Date of Patent: Mar. 4, 1997

[54] COATING COMPOSITION FOR A SUBBING LAYER ON A POLYESTER FILM FOR LIGHT SENSITIVE MATERIAL

[75] Inventors: James J. Krejci, Medina, Ohio; John M. Heberger, Greer, S.C.; Cathy R. Moore, Anderson, S.C.; Robin M. Donald, Greer, S.C.

[73] Assignee: Hoechst Celanese Corporation, Somerville, N.J.

[21] Appl. No.: 475,239

[22] Filed: Jun. 7, 1995

Related U.S. Application Data

[62] Division of Ser. No. 170,109, Dec. 20, 1993, abandoned.

[51] Int. Cl.$^6$ ............................ B32B 27/06; G03C 1/76; C09K 3/00
[52] U.S. Cl. ............................ 428/480; 428/482; 430/534; 252/182.14; 252/182.3
[58] Field of Search ........................... 252/182.14, 182.3; 430/534; 428/480, 482

[56] References Cited

U.S. PATENT DOCUMENTS

| | | |
|---|---|---|
| 3,052,543 | 9/1962 | Bauer . |
| 3,779,993 | 12/1973 | Kibler . |
| 4,043,819 | 8/1977 | Baumann ................................ 430/283 |
| 4,124,395 | 11/1978 | Ochiai et al. ........................... 428/483 |
| 4,225,665 | 9/1980 | Schadt . |
| 4,232,117 | 11/1980 | Naoi . |
| 4,252,885 | 2/1981 | McGrail . |
| 4,429,039 | 1/1984 | Ochiai . |
| 4,476,189 | 10/1984 | Posey . |
| 4,701,403 | 10/1987 | Miller ..................................... 430/529 |
| 4,960,687 | 10/1990 | Cho . |
| 4,994,353 | 2/1991 | Hatakeyama . |
| 5,079,136 | 1/1992 | Tachibana . |

FOREIGN PATENT DOCUMENTS

| | | |
|---|---|---|
| 1264338 | 2/1972 | United Kingdom . |
| WO91/18061 | 11/1991 | WIPO . |

OTHER PUBLICATIONS

U.S. Statutory Invention Registration H1016 Published Jan. 7, 1992.

*Primary Examiner*—Mark Chapman
*Attorney, Agent, or Firm*—Gregory N. Clements

[57] ABSTRACT

The present invention discloses a subbing coating composition for polyester films comprising:

I polymer A having attached to its backbone
  carboxyl groups and/or
  groups which form carboxyl groups upon hydrolysis and
  a polymer B having attached to its backbone —$SO_3X$ and/or —$PO_3XY$ groups, wherein
  X and Y are identical or different and denote an alkali metal, ammonium or hydrogen or II a polymer A' having attached to its backbone
  carboxyl groups and/or groups which form carboxyl groups upon hydrolysis, and
  —$SO_3X$ and/or —$PO_3XY$ groups, wherein X and Y are identical or different and denote an alkali metal, ammonium or hydrogen and III an organic compound C having at least two free hydroxy groups, wherein the coating composition does not comprise addition polymerizable compounds.

19 Claims, No Drawings

COATING COMPOSITION FOR A SUBBING LAYER ON A POLYESTER FILM FOR LIGHT SENSITIVE MATERIAL

This is a divisional of application Ser. No. 08/170,109 filed Dec. 20, 1993, now abandoned.

FIELD OF THE INVENTION

This invention relates to a coating composition which, when applied to a polyester film, constitutes a subbing layer which imparts improved adhesion towards a subsequently applied light sensitive material. It also relates to a polyester film coated with the above coating composition as well as to photographic film comprising a polyester base film having on at least one surface thereof a layer of the above coating composition and a light sensitive photographic layer on top of this layer.

BACKGROUND OF THE INVENTION

Due to its physical properties polyester film is an excellent support for photographic film. However, it has been difficult to obtain good adhesion towards hydrophilic photographic emulsions because polyester, as is known, is generally very hydrophobic since it does not have active functional groups for the hydrophilic emulsion to attach to. There have been suggested several ways in the prior art to render the surface of a polyester film hydrophilic so that a photographic emulsion can be directly applied onto that surface. Such methods comprised chemical treatments such as etching or corona, flame or plasma treating the polyester film surface. Another approach for rendering hydrophilicity to the film surface was to apply a subbing layer onto the polyester film. Such a subbing layer would perform a double function, i.e. it would have good adhesion towards the polyester base film on the one side and at the same time good adhesion towards the photographic emulsion. Other methods known in the art first apply an auxiliary primer layer to the polyester film surface and thereafter a subbing layer on top of the auxiliary layer. The photographic layer is then applied onto the subbing layer. The purpose of such primer layers is to enhance the adhesion of the subbing layer towards the polyester film.

Miller, U.S. Pat. No. 4,701,403 describes an antistatic coating for polyester film which coating comprises a water soluble copolymer of the sodium salt of styrenesulfonic acid and a carboxy containing monomer which copolymer is crosslinked after drying with an aziridine component. Cho, U.S. Pat. No. 4,960,687 also describes a subbing layer containing a polymer having functionally attached carboxylic acid groups such as poly- (sodium styrenesulfo-nate-maleic-anhydride) and a polyfunctional aziridine crosslinking agent for such COOH-containing polymer, which crosslinking agent is dispersed in gelatin. Ochiai et at., U.S. Pat. 4,124,395 also suggests copolymers made from maleic acid anhydride and styrene sulfonic acid in combination with an addition polymerizable monomer which may be acrylic acid, itaconic acid or triazines. Optionally a crosslinking agent may be added to the subbing composition such as crosslinking agents having a hydroxy group.

All of these known subbing layers either employ hazardous materials such as aziridines or require the use of organic solvents, the use of which in production plants is subject to severe restrictions. It was therefore an object of the instant invention to suggest a subbing layer composition which neither employs hazardous material nor requires the use of organic solvents. While accomplishing this the subbed films should at the same time provide sufficient adhesion towards a subsequently applied photographic layer. It further would be advantageous if the subbed film exhibited antistatic properties.

SUMMARY OF THE INVENTION

These and other objects of the invention are achieved by a coating composition comprising:

I polymer A having attached to its backbone
  carboxyl groups and/or
  groups which form carboxyl groups upon hydrolysis and
  a polymer B having attached to its backbone —$SO_3X$ and/or —$PO_3XY$ groups, wherein
  X and Y are identical or different and denote an alkali metal, ammonium or hydrogen or II a polymer A' having attached to its backbone
  carboxyl groups and/or groups which form carboxyl groups upon hydrolysis, and
  —$SO_3X$ and/or —$PO_3XY$ groups, wherein X and Y are identical or different and denote an alkali metal, ammonium or hydrogen and III an organic compound C having at least two free hydroxy groups, wherein the coating composition does not comprise addition polymerizable compounds.

This coating composition for a subbing layer neither employs hazardous materials nor requires organic solvents and can be brought onto a polyester film surface with known methods. It provides good adhesion towards a subsequently applied light sensitive photographic layer.

DETAILED DESCRIPTION OF THE INVENTION

The coating composition according to the invention comprises a polymer A which has attached to its backbone carboxy groups and/or groups which will form carboxy groups upon hydrolysis. The term "backbone" as used herein means the chain which is built during polymerization of the corresponding monomers. Attached to this backbone are carboxy groups or groups which will form carboxy groups upon hydrolysis. Such groups are either attached directly to the backbone or via a spacer which can be an alkylene group having one to about 8 carbon atoms. Groups which form carboxy groups upon hydrolysis comprise anhydride, esters, carboxylic acid chlorides, nitriles and acid amides. Polymer A may be a homopolymer or a copolymer. Specific examples of monomers which are suitable for forming polymer A are acrylic acid, acryloxy propionic acid, methacrylic acid, ethacrylic acid, maleic acid, maleic acid anhydride, itaconic acid, itaconic acid anhydride, vinyl benzoic acid, succinic acid or sorbic acid, with maleic acid anhydride being preferred. Copolymerizable comonomers suitable for forming a copolymer comprise esters of acrylic acid or methacrylic acid such as methyl-, ethyl-, butyl-, ethylhexyl- and phenyl-esters of acrylic acid and methacrylic acid; hydroxyalkyl acrylates and -methacrylate such as 2-hydroxyethylacrylate, 2-hydroxyethylmethacrylate, 2-hydroxypropyl acrylate, 2-hydroxypropylmethacrylate and 3-hydroxypropylmethacrylate; vinyl esters such as vinyl acetate, vinyl propionate and vinyl benzoate; vinyl ethers such as methylvinyl ether, butylvinyl ether, and phenylvinylether. Preferred copolymerizable monomers are styrene, vinyl acetate and those containing a vinyl ether group. One especially preferred copolymer is poly(methylvinyl ether/maleic anhydride) commercialized by International Specialty Products (Wayne, N.J.) under the tradename Gantrez®AN Copolymer.

Polymer B is a polymer having attached to its backbone functional groups which impart water solubility and antistatic properties. Such functional groups comprise $-SO_3X$, $-PO_3XY$, $-NH_3X$, $-NR_2HX$, $-NR_3X$, and $-PR_3X$ groups. Preferred groups are $-SO_3X$ and $-PO_3XY$ groups. X and Y represent metal ions, especially alkali metal ions such as $Li^+$, and $Na^+$ and $K^+$, ammonium or a corresponding organic quaternary ammonium ion or a proton. X and Y preferably represent $Na^+$, $K^+$ or $H^+$. It is, however, understood that in a given polymer B not all X and/or Y radicals will have to be identical; i.e., also partial salts are within the scope of the invention. One preferred polymer B is polystyrene sulfonic acid which is commercialized by National Starch and Chemical Corporation under the tradename Versa® TL72.

Instead of using individual polymers A and B it is also possible to employ a copolymer A' which incorporates the functionality of both polymers A and B. Such a copolymer A' can be synthesized from the same monomers which are used to produce polymers A and B. Such a copolymer A' would have attached to its backbone carboxy functional groups as well as sulfonic acid and/or phosphonic acid functional groups.

Organic compound C is a compound having at least two free hydroxy groups. Tri-and polyhydroxy compounds, i.e. compounds having three and more free hydroxy groups are within the scope of the invention. "Free hydroxy groups" are those OH-groups in an organic compound which are accessible for a chemical reaction. The function of compound C is to react with Polymer A and to a certain extent also with Polymer B, if present. Compound C contains a hydrocarbon nucleus to which at least two hydroxy groups are attached. The hydrocarbon nucleus itself may be represented by a branched or unbranched alkylene group which alkylene group may be interrupted by bivalent radicals such as carbonyl, carbonyloxy, oxy or thio. The hydrocarbon nucleus may also be represented by an arylene or alkylaryl which may in the same way be interrupted by bivalent radicals as are the alkylenes. Suitable arylenes are phenylene, naphthylene, biphenylene and benzylene. Suitable compounds C encompass dihydroxy substituted $C_1$ to $C_8$ alkylenes or $C_1$ to $C_4$ alkylene ethers such as diethylene glycol and triethylene glycol. Preferably triethylene glycol is used as compound C. If polymer A and polymer B is used instead of a polymer A', the function of compound C is such that it will react (crosslink) to a greater extent with compound A than with compound B. However, the degree to which compound C reacts with water soluble compound B is such that through this reaction compound B becomes water insoluble. Organic compound C is selected such that it does not react (crosslink) at a low temperature with either polymer A, polymer B or polymer A'. "Low" temperature in this context means that compound C does not react with either one of these polymers at or below room temperature (about 25° C.). The term "not react" in this context means that it will not react to an extent which will yield effective crosslinking. Preferably compound C reacts with these compounds at or around the crystallisation temperature of the polymer of the base film, which is typically polyethyleneterephthalate (PET). This temperature therefore is in the range of 100° C. to 300° C., preferably 150° C. to 250° C., especially preferred 200° C. to 230° C. If a combination of polymer A and polymer B is used, the presence of polymer B is critical because it significantly contributes to the adhesion towards the photographic layer. If Polymer A is used without Polymer B adhesion as well as antistatic properties are reduced to an extent which renders the primed film almost unusable for photographic purposes.

In a most general sense Polymer A can be present in an amount ranging from 5 to 95% by weight of the overall coating composition. More specific, Polymer A can represent from about 35 to about 70% by dry weight of the overall coating composition, preferably about 45 to 60% by dry weight, and most preferably about 55% by dry weight.

In a most general sense Polymer B can be present in an amount ranging from 2.5 to 95% by weight of the overall coating composition. More specific, Polymer B can represent from about 10 to about 40% by dry weight of the overall coating composition, preferably 20 to 25%, and most preferably about 22.5% by dry weight.

In a most general sense Component C can be present in an amount ranging from 2.5 to 95% by weight of the overall coating composition. More specific, Component C can represent from about 10 to 50% by dry weight of the overall coating composition, preferably 20 to 35% by dry weight, and most preferably about 22.5% by dry weight.

Further, it has been found that superior results are obtained if the ratio between component C and polymer B is within the range of 0.25 to 1.5, preferably 0.8 to 1.5, especially preferred is a ratio of about 1.0.

In addition, it might be useful to include additional components for specific purposes to the coating composition, provided such components do not materially interfere with the essential parts of the coating composition. Such additional components may include surfactants, especially anionic surfactants, e.g. sodium dodecylbenzene sulfonate (Rhodacal® LDS-10, Rhone-Poulenc, Cranbury, N.J.) and nonionic surfactants, especially fluorosurfactants such as the combination of fluoroaliphatic oxyethylenes of carbon chain lengths from 4 to 8 and polyoxyethylene glycol (Fluorad® FC-170C, 3M, St. Paul Minn.). The anionic surfactants may be present in a proportion of from 0.1 to 8% by dry weight (based on the total dry weight of the coating composition), and the nonionic surfactants may be present in a proportion of from 0.1 to 1.5% by dry weight (based on the total dry weight of the coating composition).

All components of the coating composition are preferably uniformly blended with one another to produce the subbing coating composition.

The subbing layer composition according to the present invention is applicable to any polyester base film which has photographic film uses as well as non-photographic film uses, such as reprographic film. Polyethylene terephthalate (PET) is the preferred polyester for the base film. The present invention may also utilize base films made of copolyesters, such as polyethylene terephthalate/isophthalate. Generally, however, any polyester film based on a polymer resulting from the polycondensation of a glycol or diol such as ethylene glycol, diethylene glycol, polyethylene glycol, neopentyl glycol, and polyols such as butanediol with a dicarboxylic acid (or its ester equivalents) such as terephthalic, isophthalic, sebacic, malonic, adipic, azelaic, glutaric, suberic, succinic acid, and the like, or mixtures of these, can be employed in the present invention.

Any of the above polymeric films can contain conventional additives, such as antistatic additives, fillers such as silica, calcium carbonate, kaolin, titanium dioxide, pigments, delusterants, etc., all of which are well known in the art.

Additionally, the polymeric film may comprise a polymeric laminate such as a polymer-polymer laminate like polyester-polyolefin, for example, or a polymer-metallic laminate such as polyester-aluminum, or a polymeric paper laminate, or the like.

Any of these films may be produced by any well known techniques in the art.

Depending on the method of application of the coating composition the solids levels within the liquid containing the coating composition can vary over a broad range. The subbing coating composition of the invention is typically applied to the base film as an aqueous solution at a solids concentration within the range of about 2.0 to about 13.5% by weight, and preferably from about 5 to 10% by weight. At a solids level below 2.0, it is believed that proper adhesion of the aqueous composition will be adversely effected because of incomplete surface coverage. Solids levels higher than the range given may be employed. However, as the solids level increases, coatability of the aqueous composition can become problematic due to an increase in viscosity. The preferred solids level, as it is applied to the polymeric substrate (base film), is preferably such that the final dry coating thickness of the dried subbing coating is from about $1 \times 10^{-7}$ to about $1 \times 10^{-4}$ cm with $5 \times 10^{-6}$ cm being the target thickness. The amount of coating on the final dried film is in the range of 0.005 to 0.2 $g/m^2$, preferably 0.01 to 0.1 $g/m^2$ with about 0.05 $g/m^2$ being the target amount.

This subbing coating solution may be applied to the polymeric base film by any suitable known method. For example, roll coating, reverse roll coating, gravure roll coating, air knife coating, dipping, slot, slide curtain or meniscus coating may be employed. In-line coating is not mandatory, however, it gives the best results and is by far the most economic coating technique known today and is therefore preferred. "In-line coating" in this context refers to coating the surface of a film at various stages of the film making process.

The subbing coating may be applied to one or both sides of the base film, depending on its final application. For example, in those situations where it is desirable to have adhesion to both sides of a polyester film for a photographic film usage, the film may be coated on each side with a layer of said subbing coating and then —optionally after a drying and curing process-overcoated with the necessary gelatinous layers, including the light-sensitive photographic gelatinous layer.

Best adhesion towards a subsequently applied photographic layer is obtained when the polymeric base film is first coated with a primer layer and thereafter with the subbing coating composition according to the present invention. Many primer coating compositions may be employed in the present invention. A preferred primer is disclosed in U.S. Pat. No. 4,493,872, the teaching of which is incorporated herein by reference. This primer composition comprises a water dispersible copolyester, preferably made from isophthalic acid and 5-sodium-sulfoisophthalic acid (and equimolar amounts of ethylene glycol). For best results it has been proven advantageous to add an anionic surfactant to the copolyester primer composition and a crosslinker such as melamine formaldehyde. Suitable anionic surfactants include sodium lauryl sulfate, sodium dodecylbenzene sulfonate, and sodium alkylarylpolyether sulfonate. The proportion of the anionic surfactant to the copolyester may be in a range from about 1% to 15% by weight of the copolyester. The preferred range is 2 to 3% by weight. Another preferred copolyester primer composition is disclosed in U.S. Pat. No. 4,476,189, the teaching of which is also incorporated herein by reference. This primer composition comprises a water dispersible copolyester, preferably made from terephthalic acid and 5-sodium-sulfoisophthalic acid (and equimolar amounts of ethylene glycol). When employing this copolyester there is no need for an additional crosslinker. All components of the primer composition are uniformly blended with one another to produce the primer coating. Compared with known photographic films, which usually employ halide containing primers (e.g. vinylidene chloride), the copolyester primed and later subbed films according to the present invention provide much better reclaimability.

Like the coating composition according to the present invention this primer coating is typically applied to the base film as an aqueous solution or dispersion. Solids concentration is usually within the range of about 0.5 to 15% by weight, preferably from about 5 to 10% by weight. The preferred solids level, as it is applied to the polymeric substrate, is such as to yield a final dry coating thickness within the range of from about 0.005 $g/m^2$ to 0.2 $g/m^2$. The preferred range is from about 0.01 to 0.1 $g/m^2$. The preferred thickness range of the dried primer coating is from about $1 \times 10^{-7}$ to $1 \times 10^{-4}$ cm with $1 \times 10^{-6}$ cm being the target thickness.

Like the coating composition according to the present invention this primer coating may be applied to the polymeric substrate by any suitable known method. For example, roll coating, reverse roll coating, gravure roll coating, air knife coating, dipping, slot, slide curtain or meniscus coating may be employed. The primer coating may be applied to one or both sides of the base film, depending on its final application. It is preferred to apply the primer coating in-line at any stage during the manufacturing process of the base film, however, before the subbing coating composition is applied. Such stages include pre-draw, after longitudinal stretch and after stretching in the transverse direction. For the present invention this first primer coating was provided in-line, in advance of the machine drawing stage, directly upon the cast sheet of polyester base film sheet, as that sheet is cooled upon extrusion.

While it is an advantage of the coating composition according to the present invention that surface treatment such as corona treatment is not necessary, it may nevertheless be applied when deemed necessary.

To produce a photographic film, the subbed film of the present invention must be overcoated with one or more gelatinous layers. Various gelatinous compositions for photographic film use are well known in the an and may consist of porkskin gelatin based composition, bone gelatin compositions, etc. Suitable photographic gelatinous compositions are typically made by the Croda Company, the Rousselot Company, the Kind & Knox Co., and many others.

Coating the subbed film with the gelatin occurs generally after the film has been heat set. The gelatin composition can be applied by any of the methods described regarding the primer and subbing coating.

The general process employed for the present invention comprises: if employed, in-line coating the polymeric base film with the primer coating, either before, during or after drawing the film; drying the primer coating composition to form a (first) primer coated film; in-line coating the polymeric base film, or the (first) primer coated film, with the subbing composition according to the present invention before, during, or after drawing the film, but preferably after drawing the film in the machine direction, and before heat setting; drying the subbing coating composition to form a (second) subbed film; and over-coating the (second) subbed film after heat setting with one or more gelatinous layers, including at least one light-sensitive photographic gelatinous layer. For example, a polyester film substrate can optionally be coated with a primer coating composition, then coated with a subbing composition, and overcoated with a light-sensitive photographic gelatinous layer.

In the above example, the light-sensitive photographic layer is bonded directly to the subbing layer of the present invention. It is certainly possible, however, to have the light-sensitive photographic gelatinous layer bonded to an underlying gelatin layer through a gelatin-gelatin bonding mechanism, with such underlying gelatin layer bonded to the subbing layer of the present invention.

The light-sensitive photographic layer is usually based on a Type B gelatin. Typically, the light-sensitive gelatin contains a light-sensitive composition based upon a silver halide. As discussed in Chapter 2, Section III, pages 79–80 of "The Theory of the Photographic Process", Fourth Edition, formaldehyde and glyoxal are commonly used hardeners (crosslinkers) for gelatin. In "Glyoxal", a product information bulletin published by Societe Francaise Hoechst, glyoxal is described on page 26 as an excellent hardener for gelatin and it is reported that glyoxal can be used in combination with formaldehyde to harden gelatin. The Photographic Test Coating used in the following examples is a solution of gelatin containing glyoxal and formaldehyde as hardeners.

GENERAL TESTING CONDITIONS

For determining the suitability of the subbed film of the present invention for photographic uses, three adhesion tests are performed. The first of these three tests is "dry adhesion" of unprocessed photographic layers. In this test, the samples of the subbed polyester film are coated with a Photographic Test Coating. The Photographic Test Coating is dried before further processing. The samples are then torn to expose a rough edge. A piece on No. 810 Scotch® tape is placed over the torn edge and pulled away sharply. If no removal of the Photographic Test Coating occurs, the sample is ranked Grade 1. If limited removal in small pieces occurs, the sample is rated Grade 2. If removal greater than or equal to the tape area occurs, the sample is ranked as a Grade 3. Only grade 1 is considered acceptable.

The second important adhesion test is called the "wet adhesion" of processed photographic layers. Samples of the subbed film are subsequently over-coated with a Photographic Test Coating and are processed through the following sequences of photo processing chemicals, namely:

1) submerged in developer for 2.5 minutes;
2) rinsed with water for 30 seconds;
3) submerged in a fixer for 3 minutes; and,
4) rinsed with water for 3 minutes.

The temperature of the water rinse in both steps 2 and 4 is ambient (ca 25° C. ). The developer employed is Repro-lith® 200, a commercially available developer produced by Anitec Image Corporation (Binghamton, N.Y.). At the end of the four steps, the sample is scored with a scribing tool and a rubber stopper is rubbed across the sample several times, applying 2 kilogram weight of pressure. Samples are examined for degree of failure. No removal of test gelatin coating beyond the score line is Grade 1, very limited removal is Grade 2, and general loss of the gelatin coating is Grade 3. Only Grade 1 is considered acceptable.

The third adhesion test is called the "processed dry adhesion" test. Samples of the subbed film are overcoated with a Photographic Test Coating and processed through the same four sequence steps as mentioned for "wet adhesion". After drying the film for 15 minutes at 40° C., adhesion is tested by taping a torn edge with a piece of No. 810 Scotch® tape as is described with respect to the "dry adhesion" test of unprocessed photographic layers. The same ratings apply for this test as with the "dry" and "wet adhesion" test mentioned previously. Only Grade 1 is considered acceptable.

For the following Examples, the polymeric base film was produced with an unfilled polyethylene terephthalate resin made by the Hoechst Diafoil Corporation. None of the samples was corona treated prior to coating. The various coatings were applied either to the cast sheet (primer coating) or interdraw (subbing coating) as noted.

Antistatic properties were derived from a measurement of the surface resistivity at a relative humidity of 50% at 23° C. and is given in $\Omega$/square (ASTM D257). Surface resistivities below $10^{12}$ $\Omega$/square are considered acceptable. Antistatic properties were measured on the film according to example XXIX and determined to be $1.2 \times 10^{10}$ $\Omega$/square. The film was then rinsed with deionized water (25° C.) for 2 minutes and dried at 49° C. for 15 minutes. Thereafter the surface resistivity was measured again and was determined to be $2.4 \times 10^{11}$ $\Omega$/square. Such marginal drop in surface resistivity was unexpected and surprising and demonstrated that the subbing layer on the finished film was water insoluble.

One skilled in the art would understand that the present invention does not depend upon the Photographic Test Coating composition. The Photographic Test Coating employed in all Examples was the same composition and was made of gelatin, using glyoxal and formaldehyde as hardeners.

EXAMPLES

Example 1

An amorphous, unfilled polyethyleneterephthalate (PET) film was formed, stretched 3.25 times in the machine direction, stretched to about 3.8 times the original width in the transverse direction, and heat set at a temperature between 190° C. and 240° C. One coating station (Coating Station 1) was set up to coat the cast sheet prior to the first stretching step (machine draw, longitudinal draw), and another coating station (Coating Station 2 ) was set up to coat the longitudinally drawn sheet prior to the second stretching step (transverse stretching). Both coating stations coated the same side of the film with drying between each coating step.

Aqueous primer and subbing coating compositions identified in Table 1 were applied to the polyester sheet as set out in Table 2.

The subbed film was subsequently coated to a dry coating weight of approximately 5 g/m$^2$ with the Photographic Test Coating and dried with hot air at 49° C. Then the adhesion tests were carried out. The determination of surface resistivity was carried out on the subbed base film without applying the Photographic Test Coating.

All percentage values given in Table 1 are weight percentages if not otherwise indicated.

TABLE 1

| Composition | Function | Formulation |
|---|---|---|
| A | primer | 10% Copolyester (9:1 molar ratio of isophthalic acid and 5-Na-sulfoisophthalic acid; equimolar amount of ethylene glycol)<br>1.5% Hexamethoxymethylmelamine (Cymel 303)<br>0.284% Surfactant (Rhodacal LDS-10)<br>0.07% Fluorosurfactant (Fluorad FC-170C)<br>1.2% Colloidal $SiO_2$ (Nalco 1060)<br>86.946% Deionized water |
| B | primer | 10% Copolyester (9:1 molar ratio of isophthalic acid and 5-Na-sulfoisophthalic acid; equimolar amount of ethylene glycol)<br>1.0% Hexamethoxymethylmelamine (Cymel 303)<br>0.284% Surfactant (Rhodacal LDS-10)<br>0.07% Fluorosurfactant (Fluorad FC-170C)<br>1.2% Colloidal $SiO_2$ (Nalco 1060)<br>87.446% Deionized water |
| C | primer | 4% aqueous solution of<br>100% thermoset acrylic (Rhoplex AC-201) |
| D | primer | 4% aqueous solution of a self crosslinking acrylic made of<br>30% methylmethacrylate<br>65% dimethylaminoethylmethacrylate dimethylsulfate-quaternary salt<br>5% N-methylolacrylamid |
| 1 | subbing | 6.75% aqueous solution of<br>65% Polymer A (Gantrez AN-119BF)<br>15% Polymer B (Versa TL72)<br>20% Compound C (Triethylene Glycol)<br>0.7%* Fluorsurfactant (Fluorad FC-170C) |
| 2 | subbing | 6.75% aqueous solution of<br>65% Polymer A (Gantrez AN-119BF)<br>20% Polymer B (Versa TL72)<br>15% Compound C (Triethylene Glycol)<br>0.7%* Fluorsurfactant (Fluorad FC-170C) |
| 3 | subbing | 6.75% aqueous solution of<br>60% Polymer A (Gantrez AN-119BF)<br>15% Polymer B (versa TL72)<br>25% Compound C (Triethylene Glycol)<br>0.7%* Fluorsurfactant (Fluorad FC-170C) |
| 4 | subbing | 6.75% aqueous solution of<br>60% Polymer A (Gantrez AN-119BF)<br>20% Polymer B (Versa TL72)<br>20% Compound C (Triethylene Glycol)<br>0.7%* Fluorsurfactant (Fluorad FC-170C) |
| 5 | subbing | 6.75% aqueous solution of<br>60% Polymer A (Gantrez AN-119BF)<br>25% Polymer B (Versa TL72)<br>15% Compound C (Triethylene Glycol)<br>0.7%* Fluorsurfactant (Fluorad FC-170C) |
| 6 | subbing | 6.75% aqueous solution of<br>55% Polymer A (Gantrez AN-119BF)<br>15% Polymer B (Versa TL72)<br>30% Compound C (Triethylene Glycol)<br>0.7%* Fluorsurfactant (Fluorad FC-170C) |
| 7 | subbing | 6.75% aqueous solution of<br>55% Polymer A (Gantrez AN-119BF)<br>20% Polymer B (Versa TL72)<br>25% Compound C (Triethylene Glycol)<br>0.7%* Fluorsurfactant (Fluorad FC-170C) |
| 8 | subbing | 6.75% aqueous solution of<br>55% Polymer A (Gantrez AN-119BF)<br>22.5% Polymer B (Versa TL72)<br>22.5% Compound C (Triethylene Glycol)<br>0.7%* Fluorsurfactant (Fluorad FC-170C) |
| 9 | subbing | 6.75% aqueous solution of<br>55% Polymer A (Gantrez AN-119BF)<br>25% Polymer B (Versa TL72)<br>20% Compound C (Triethylene Glycol)<br>0.7%* Fluorsurfactant (Fluorad FC-170C) |
| 10 | subbing | 6.75% aqueous solution of<br>55% Polymer A (Gantrez AN-119BF)<br>30% Polymer B (Versa TL72)<br>15% Compound C (Triethylene Glycol)<br>0.7%* Fluorsurfactant (Fluorad FC-170C) |
| 11 | subbing | 6.75% aqueous solution of<br>50% Polymer A (Gantrez AN-119BF)<br>15% Polymer B (Versa TL72)<br>35% Compound C (Triethylene Glycol)<br>0.7%* Fluorsurfactant (Fluorad FC-170C) |
| 12 | subbing | 6.75% aqueous solution of<br>50% Polymer A (Gantrez AN-119BF)<br>20% Polymer B (Versa TL72)<br>30% Compound C (Triethylene Glycol)<br>0.7%* Fluorsurfactant (Fluorad FC-170C) |
| 13 | subbing | 6.75% aqueous solution of<br>50% Polymer A (Gantrez AN-119BF)<br>25% Polymer B (Versa TL72)<br>25% Compound C (Triethylene Glycol)<br>0.7%* Fluorsurfactant (Fluorad FC-170C) |
| 14 | subbing | 6.75% aqueous solution of<br>50% Polymer A (Gantrez AN-119BF)<br>30% Polymer B (Versa TL72)<br>20% Compound C (Triethylene Glycol)<br>0.7%* Fluorsurfactant (Fluorad FC-170C) |
| 15 | subbing | 6.75% aqueous solution of<br>45% Polymer A (Gantrez AN-119BF)<br>15% Polymer B (Versa TL72)<br>40% Compound C (Triethylene Glycol)<br>0.7%* Fluorsurfactant (Fluorad FC-170C) |
| 16 | subbing | 6.75% aqueous solution of<br>45% Polymer A (Gantrez AN-119BF)<br>20% Polymer B (Versa TL72)<br>35% Compound C (Triethylene Glycol)<br>0.7%* Fluorsurfactant (Fluorad FC-170C) |
| 17 | subbing | 6.75% aqueous solution of<br>45% Polymer A (Gantrez AN-119BF)<br>25% Polymer B (Versa TL72)<br>30% Compound C (Triethylene Glycol)<br>0.7%* Fluorsurfactant (Fluorad FC-170C) |
| 18 | subbing | 6.75% aqueous solution of<br>45% Polymer A (Gantrez AN-119BF)<br>30% Polymer B (Versa TL72)<br>25% Compound C (Triethylene Glycol)<br>0.7%* Fluorsurfactant (Fluorad FC-170C) |
| 19 | subbing | 6.75% aqueous solution of<br>45% Polymer A (Gantrez AN-119BF)<br>35% Polymer B (Versa TL72)<br>20% Compound C (Triethylene Glycol)<br>0.7%* Fluorsurfactant (Fluorad FC-170C) |
| 20 | subbing | 6.75% aqueous solution of<br>40% Polymer A (Gantrez AN-1<br>15% Polymer B (Versa TL72)<br>45% Compound C (Triethylene Glycol)<br>0.7%* Fluorsurfactant (Fluorad FC-170C) |
| 21 | subbing | 6.75% aqueous solution of<br>40% Polymer A (Gantrez AN-119BF)<br>20% Polymer B (Versa TL72)<br>40% Compound C (Triethylene Glycol)<br>0.7%* Fluorsurfactant (Fluorad FC-170C) |
| 22 | subbing | 6.75% aqueous solution of<br>40% Polymer A (Gantrez AN-119BF)<br>25% Polymer B (Versa TL72)<br>35% Compound C (Triethylene Glycol)<br>0.7%* Fluorsurfactant (Fluorad FC-170C) |
| 23 | subbing | 6.75% aqueous solution of<br>40% Polymer A (Gantrez AN-119BF)<br>30% Polymer B (Versa TL72)<br>30% Compound C (Triethylene Glycol)<br>0.7%* Fluorsurfactant (Fluorad FC-170C) |
| 24 | subbing | 6.75% aqueous solution of<br>40% Polymer A (Gantrez AN-119BF)<br>35% Polymer B (Versa TL72)<br>25% Compound C (Triethylene Glycol)<br>0.7%* Fluorsurfactant (Fluorad FC-170C) |

TABLE 1-continued

| Composition | Function | Formulation |
|---|---|---|
| 25 | subbing | 13.5% aqueous solution of<br>35.5% Polymer A (Gantrez AN-139)<br>22% Polymer B (Versa TL72)<br>42.5% Compound C (Triethylene Glycol)<br>0.7%* Fluorsurfactant (Fluorad FC-170C) |

(*Based on the total amount of Polymer A, Polymer B and Compound C solids).

TABLE 2

| | Coating Station | | Gelatin Adhesion | | |
|---|---|---|---|---|---|
| | 1 | 2 | | | |
| Sample | composition | composition | Dry | Wet | Process Dry |
| I | B | 1 | 1 | 1 | 1 |
| II | B | 2 | 1 | 1 | 1 |
| III | B | 3 | 1 | 1 | 1 |
| IV | B | 4 | 1 | 1 | 1 |
| V | B | 5 | 1 | 1 | 1 |
| VI | B | 6 | 1 | 1 | 1 |
| VII | B | 7 | 1 | 1 | 1 |
| VIII | B | 8 | 1 | 1 | 1 |
| IX | — | 8 | 1 | 2 | 3 |
| X | A | 8 | 1 | 1 | 1 |
| XI | C | 8 | 1 | 1 | 3 |
| XII | D | 8 | 2 | 2 | 2 |
| XIII | B | 9 | 1 | 1 | 1 |
| XIV | B | 10 | 1 | 1 | 1 |
| XV | B | 11 | 1 | 1 | 1 |
| XVI | B | 12 | 1 | 1 | 1 |
| XVII | B | 13 | 1 | 1 | 1 |
| XVIII | B | 14 | 1 | 1 | 1 |
| XIX | B | 15 | 1 | 1 | 1 |
| XX | B | 16 | 1 | 1 | 1 |
| XXI | B | 17 | 1 | 1 | 1 |
| XXII | B | 18 | 1 | 1 | 1 |
| XXIII | B | 19 | 1 | 1 | 1 |
| XXIV | B | 20 | 1 | 1 | 1 |
| XXV | B | 21 | 1 | 1 | 1 |
| XXVI | B | 22 | 1 | 1 | 1 |
| XXVII | B | 23 | 1 | 1 | 1 |
| XXVIII | B | 24 | 1 | 1 | 1 |
| XXIX | B | 25 | 1 | 1 | 1 |

Thus, it is apparent that there has been provided, in accordance with the invention, a subbing composition, a subbed film, a subbed film coated with a gelatin composition, and a process for producing a photographic film that fully satisfies the object, aims, and advantages set forth above. While the invention has been described in conjunction with specific embodiments thereof, it is evident that many alternatives, modifications, and variations will be apparent to those skilled in the an in light of the foregoing description. Accordingly, it is intended to embrace all such alternatives, modifications, and variations as fall within the spirit and broad scope of the present invention.

What is claimed is:

1. A subbing coating consisting essentially of components I and III or components II and III, wherein I, II and III are as follows:

I a polymer A having attached to its backbone carboxyl groups and/or groups which form carboxyl groups upon hydrolysis, and
a polymer B having attached to its backbone —$SO_3X$ and/or —$PO_3XY$ groups, wherein X and Y are identical or different and denote an alkali metal, ammonium, organic quaternary ammonium or hydrogen;

II a polymer A' having attached to its backbone carboxyl groups and/or groups which form carboxyl groups upon hydrolysis, and —$SO_3X$ and/or —$PO_3XY$ groups, wherein X and Y are identical or different and denote an alkali metal, ammonium, organic quaternary ammonium or hydrogen;

III an organic compound C having at least two free hydroxy groups, wherein the subbing does not comprise addition polymerizable compounds.

2. A subbing coating according to claim 1, wherein said subbing coating consists essentially of a uniform blend of components I and III or components II and III.

3. An aziridine-free subbing coating, which subbing coating comprises components I and III or components II and III, wherein components I, II and III are as follows:

I a polymer A having attached to its backbone carboxyl groups and/or groups which form carboxyl groups upon hydrolysis and a polymer B having attached to its backbone —$SO_3X$ and/or —$PO_3XY$ groups, wherein X and Y are identical or different and denote an alkali metal, ammonium, organic quaternary ammonium or hydrogen;

II a polymer A' having attached to its backbone carboxyl groups and/or groups which form carboxyl groups upon hydrolysis, and —$SO_3X$ and/or —$PO_3XY$ groups, wherein X and Y are identical or different and denote an alkali metal, ammonium, organic quaternary ammonium or hydrogen;

III an organic compound C having at least two free hydroxy groups, wherein the subbing coating does not comprise addition polymerizable compounds.

4. A subbing coating according to claim 3 wherein the subbing coating comprises a uniform blend of components I and III or components II and III.

5. A subbing coating according to claim 1 or 3, wherein polymer A is a homopolymer or a copolymer and is made from one or more monomers (a) selected from the group consisting of acrylic acid, acryloxy propionic acid, methacrylic acid, ethacrylic acid, maleic acid, maleic acid anhydride, itaconic acid, itaconic acid anhydride, vinyl benzoic acid, succinic acid and sorbic acid or from one or more monomers (a) and one or more monomers (b) selected from the group consisting of styrene, esters of acrylic acid or methacrylic acid, hydroxyalkyl acrylates and methacrylates, vinyl esters and vinyl ethers.

6. A subbing coating according to claim 5 wherein monomer (b) is selected from the group consisting of styrene; methyl-, ethyl, butyl-, ethylhexyl- and phenyl esters of acrylic acid and methacrylic acid; 2-hydroxyethylacrylate, 2-hydroxyethylmethacrylate; 2-hydroxypropylacrylate, 2-hydroxypropylmethacrylate; 3-hydroxypropylmethacrylate, vinyl acetate, vinyl propionate; vinyl benzoate; methylvinyl ether; butylvinyl ether and phenylvinyl ether.

7. A subbing coating according to claim 6 wherein monomer (a) is maleic acid anhydride and monomer (b) is styrene, vinyl acetate or a vinyl ether.

8. A subbing coating according to claim 7 wherein polymer A is a copolymer which is poly(methylvinyl ether/maleic anhydride).

9. A subbing coating according to claim 8 wherein polymer B is polystyrene sulfonic acid.

10. A subbing coating according to claim 1 or 3 wherein polymer A' is a copolymer of a monomer selected from the group consisting of acrylic acid, acryloxy propionic acid, methacrylic acid, ethacrylic acid, maleic acid, maleic acid anhydride, itaconic acid, itaconic acid anhydride, vinyl benzoic acid, succinic acid and sorbic acid, and a monomer which is styrene sulfonic acid.

11. A subbing coating according to claim 10 wherein polymer A' is a copolymer of maleic anhydride and styrene sulfonic acid.

12. A subbing coating according to claim 11 wherein compound C is diethylene glycol or triethylene glycol.

13. A subbing coating according to claim 11 wherein compound C is a dihydroxy $C_1$ to $C_4$ alkylene ether.

14. A subbing coating according to claim 11 wherein compound C contains a hydrocarbon nucleus to which at least two hydroxy groups are attached, said hydrocarbon nucleus being an alkylene radical, which may be interrupted by carbonyl, carbonyloxy, oxy or thio, or a phenylene, naphthylene, biphenylene or benzylene radical.

15. A subbing coating according to claim 1 or 3 wherein Polymer A, Polymer B and Compound C comprise 35 to 70%, 10 to 40% and 10 to 50%, respectively, based on the dry weight, of said coating composition.

16. A subbing coating comprising a product of reacting, at a temperature in the range 100° C. to 300° C., components I and III or components II and III of a composition which does not comprise addition polymerizable compounds or an aziridine, wherein components I, II and III are as follows:

I. a polymer A having attached to its backbone carboxyl groups and/or groups which form carboxyl groups upon hydrolysis, and a polymer B having attached to its backbone —$SO_3X$ and/or —$PO_3XY$ groups, wherein X and Y are identical or different and denote an alkali metal, ammonium, organic quaternary ammonium or hydrogen;

II a polymer A' having attached to its backbone carboxyl groups and/or groups which form carboxyl groups upon hydrolysis, and —$SO_3X$ and/or —$PO_3XY$ groups, wherein X and Y are identical or different and denote an alkali metal, ammonium, organic quaternary ammonium or hydrogen;

III. an organic compound C having at least two free hydroxy groups.

17. A subbing coating according to claim 16 wherein the subbing coating is a product of reacting components I and III wherein polymer A is a homopolymer or a copolymer and is made from one or more monomers (a) selected from the group consisting of acrylic acid, acryloxy propionic acid, methacrylic acid, ethacrylic acid, maleic acid, maleic acid anhydride, itaconic acid, itaconic acid anhydride, vinyl benzoic acid, succinic acid and sorbic acid or from one or more monomers (a) and one or more monomers (b) selected from the group consisting of styrene, esters of acrylic acid or methacrylic acid, hydroxyalkyl acrylates and methacrylates, vinyl esters and vinyl ethers, and compound C contains a hydrocarbon nucleus to which at least two hydroxy groups are attached, said hydrocarbon nucleus being an alkylene radical, which may be interrupted by carbonyl, carbonyloxy, oxy or thio, or a phenylene, naphthylene, biphenylene or benzylene radical.

18. A subbing coating according to claim 17 wherein polymer B is polystyrene sulfonic acid.

19. A subbing coating according to claim 18 wherein polymer A is a copolymer which is poly(methylvinyl ether/ maleic anhydride) and compound C is triethylene glycol.

* * * * *